Dec. 8, 1964 J. M. ANDEREGG 3,160,739

CARD READING DEVICE

Filed Dec. 12, 1960

INVENTOR
JOHN M. ANDEREGG

BY G. R. Gugger
AGENT 3,160,739
Patented Dec. 8, 1964

3,160,739

CARD READING DEVICE

John M. Anderegg, Endicott, N.Y., assignor to International Business Machines Corporation, New York, N.Y., a corporation of New York Filed Dec. 12, 1960, Ser. No. 75,317
6 Claims. (Cl. 235—61.11)

This invention relates to a card reading device and more particularly to a device for receiving a perforated tabulating card and automatically moving it past suitable perforation sensing means.

In systems where the actual processing of data forms only a small part of the overall system, it is most often desired to make use of an efficient data processing device which is both simple and economical. For example, in an assembly line type of system involving the packaging and distribution of large amount of different type machine processable tabulating cards, one of the steps involved is to provide on each package some means of identification which will indicate where in temporary storage a particular package is to be placed. The application of the identification means to the package or carton is usually controlled by a special perforated code card which accompanies each package going through line. An operator stationed at a particular station along the line will take each code card and process it through a convenient card reader and the card reader in turn will control suitable mechanism for applying identification means on each package in accordance with the data sensed in the code card associated with that package. The identification means may take the form of a staple positioned in any one of a number of coded positions on the top of the package or carton of cards. An so, there is desired a simple, efficient and yet economical card reader which will perform its function without materially adding to the cost of packaging system of this type.

In providing such a card reader, the present invention makes use of a simple and positive acting air driven mechanism for transporting each perforated code card past a set of reading brushes. The cards are inserted into a vertical slot and fall until they come to rest against an L-shaped card clamp. This card clamp is moved in a downward direction by an air cylinder to move the card past read brushes and a read roller. The card is held securely in the card clamp by a clamp roller which is firmly positioned against the card when the card clamp moves downwardly. At a predetermined position in the downward motion of the clamp, the clamp roller is moved by a release lever to disengage the card. The card is stripped from the clamp and drops into a card receiver. Reversed air pressure then returns the clamp to the top position to receive a new card.

Accordingly, a principal object of the present invention is to provide an improved card reading device which is particularly simple in construction and efficient in operation.

A further object of the present invention is to provide an improved card reading device having air driven card clamping means for transporting a card past the card reading means.

The foregoing and other objects, features and advantages of the invention will be apparent from the following more particular description of a preferred embodiment of the invention, as illustrated in the accompanying drawings.

Figure 2:
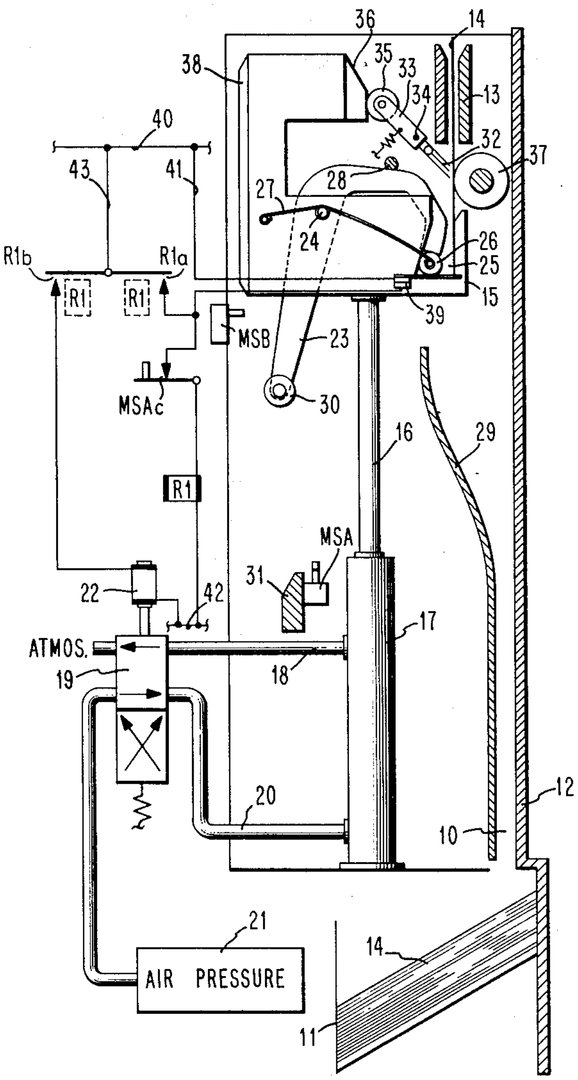
FIG. 2 is a sectional view taken on line 2—2 of FIG. 1 with the back mounting plate added and a schematic wiring diagram added.
Figure 1:
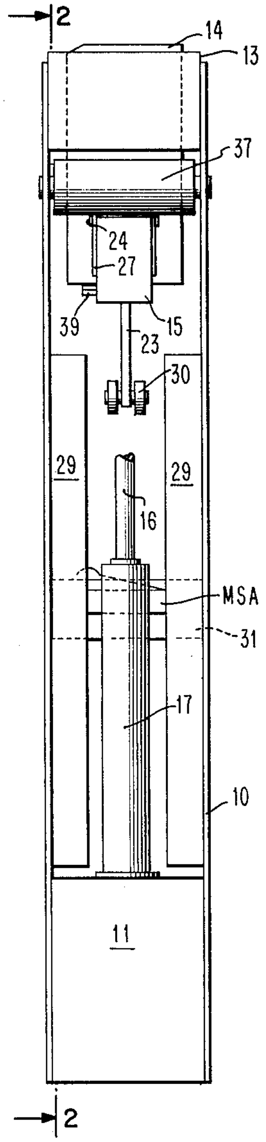
FIG. 1 is a rear elevation view, with the back mounting plate removed, showing the card reading device constructed in accordance with the principles of the present invention.

Referring to FIGS. 1 and 2, the card reading device comprises a pair of upright side plates 10 which are joined together at the bottom to form a card stacker tray 11. The side plates are suitably attached to a back plate 12 which serves as a mounting plate for the reading device and fixed between the side plates at the top of the device is a pair of card guide plates 13 which are arranged to form a throat or chute into which a card 14 to be read is inserted.

Positioned underneath the card guides and adapted to support an inserted card is a movable L-shaped card carriage unit or platform 15 which is fastened to and supported by the piston rod 16 of a conventional double acting air cylinder 17. The cylinder is connected at the top to a suitable line or hose 18 which normally communicates with the atmosphere through a solenoid valve 19 and the bottom of the cylinder is connected to another line or hose 20 which normally communicates with a suitable source 21 of air under pressure through the solenoid valve. Hence, in the normal position the air pressure in line 20 places the piston rod 16 at the top of its stroke and the carriage unit 15 in position to receive an inserted card. As will be described, controls are provided for automatically effecting energizaton and deenergization of a solenoid 22 which operates the solenoid valve 19 to effect reciprocation of the piston rod 16 and carriage unit 15.

The carriage unit includes a card clamping mechanism for exerting a positive grip on the inserted card during the time that the carriage is moving downward and the card is being read. This mechanism comprises a release lever 23 which extends through a slot in the unit and which is pivotally supported on a fixed shaft 24. As shown in FIG. 2, the lower section of the L-shaped carriage unit has a notched portion 25 which is adapted to receive the end of the card and also to house a clamp roller 26. The ends of the clamp roller are each mounted on the end of a related spring strip 27 which bends over the end of the shaft 24 and which has its other end fastened to the carriage unit. The notched portion 25 has a back side which is substantially vertical and a front side which slopes at an angle of around 10 degrees from the vertical such that when the carriage unit reaches the normal position at the top of its stroke, a fixed pin 28 will cam the release lever in a clockwise direction and the tip of the lever will cam the clamp roller down and away from the vertical side of the notch to allow clearance room for the card to be inserted. When the carriage unit is moved downward at the start of a reading cycle, the spring biased clamp roller will be allowed to move upward and toward the vertical side of the notch to wedge against the card and the sides of the notch. As a result, a strong clamping action is exerted on the card during the downward movement of the carriage.

The carriage unit, clamping mechanism and the inserted card will all move downward together and during this movement the card will pass between the back mounting plate 12 and a pair of S-shaped knock out bars 29 fastened to the side plates of the device. After the card has been read and the carriage unit is approaching the bottom of its downstroke, a pair of cam follower rollers 30 on the end of the release lever 23 will coact against the inclined surface of a cam bar 31, fastened between the side plates, and the release lever will be pivoted clockwise to force the clamping roller 26 down and release the card. The carriage unit will continue to move downward after the card has been released by the clamping roller during which time the card will be supported by the inclined portion of the knockout bars. When the carriage unit has moved downward sufficiently to allow the vertical side of the notched portion 25 to clear the bottom edge of the card, the card will be free to fall between the knockout bars 29 and backplate 12 and on down into the stacker box 11. When the carriage unit reaches the bottom of its downward travel, the bottom of the unit will actuate a micro switch MSA mounted on the cam bar 31 to cause, in a manner to be described, reverse movement of the piston rod 16 to return the carriage unit upward to its original position.

For reading the card there is provided a row of 12 sensing brushes 32 which extend across the width of the carriage unit. The brushes are mounted in a holder 33 which is pivoted on a stud shaft 34 fixed to the side frames 10 of the machine. The brush holder is suitably biased counterclockwise so that a roller 35 mounted thereon will follow the cam surface 36 on the carriage unit. A conventional electrical contact roller 37 is mounted between the side frames and when the carriage unit is in a normal position at the top of its travel, the camming surface 36 will hold the brushes out of contact with the contact roller to allow for easy insertion of a card between the brushes and the roller. The use of electrical brushes and a contact roller is well known in the card analyzing art and it is not deemed necessary to show their circuit connections. It will be understood that the brushes establish electrical connections through the perforations in the card to set up control circuits and the like. In the present device, the circuit to either the brushes or the contact roller is normally held open until such time as the carriage unit starts downward at the beginning of a reading cycle, at which time a cam surface 38 on the back of the carriage closes a micro switch MSB to render the sensing circuits operative during the time that the card is being moved past the brushes.

The record card 14 may take the form of any of several well-known record cards currently in use. A preferred form of record card is shown, for example, in FIG. 4 of U.S. Patent 2,793,695 issued on May 28, 1957. Such a card is divided into parallel columns with each column having nine or more different positions or index points. Each index point represents a different value by virtue of its location from a reference edge of the card, so that when a perforated card is analyzed by moving it past the sensing brushes in a columnar direction the index points will control associated representing devices.

Referring to FIG. 2, there is shown the circuit for controlling the operation of the solenoid valve 19 to effect the proper reciprocation of the carriage unit. Normally the valve assumes the position shown in FIG. 2 whereby air under pressure is transmitted by line 20 to the air cylinder to move the carriage unit to its upper limit of travel where it is in position to receive a record card. The insertion of a cord into the carriage unit will effect the closure of a pair of card contacts 39 mounted in the base of the carriage and a circuit will be completed from line 40, wire 41, the now closed card contacts 39, the normally closed contacts MSA*c* of micro switch MSA, the pick coil of relay R1 and line 42. Relay R1 will hold by a circuit through the normally closed contacts MSA*c* and its own now closed R1*a* contacts. The energization of relay R1 will complete a circuit from line 40, wire 43, the now closed contacts R1*b*, solenoid 22 and line 42. Solenoid 22 will operate the solenoid valve 19 to reverse the air flow to the cylinder, as indicated by the arrows in the bottom half of the valve. Air under pressure will now be supplied to the top of the cylinder by way of line 18, with line 20 now handling the exhaust at the bottom, and the carriage unit and card will be driven downward to carry out the reading operation. It will be noted that when the high portion of cam surface 36 clears the roller follower 35, the brushes 32 will pivot into contact with the moving card.

After the card has been read, the card will be released, stripped from the unit and stacked, as previously described, and continued movement of the carriage unit will operate the micro switch MSA to open the normally closed MSA*c* contacts. Opening of these contacts will result in dropping out relay R1. The relay R1*b* contacts will now open to de-energize the solenoid 22 which in turn will reverse the solenoid valve 19 back to its original position. Air cylinder 17 will now operate to rapidly return the carriage unit back up to its original position to receive another card.

There has thus been provided a simple card reading device which has been designed for single card insertion. The device is unique in its economy of parts required for automatic operation, in the rapid and efficient operation of its air driven carriage unit, and in the manner in which the card is clamped and then released during movement of the carriage.

While the invention has been particularly shown and described with reference to a preferred embodiment thereof, it will be understood by those skilled in the art that various changes in form and details may be made therein without departing from the spirit and scope of the invention.

What is claimed is:

1. In a device of the class described having a card analyzing station and sensing means at said station for sensing perforations in record cards, a card feeding mechanism comprising, means for guiding an inserted record card to said analyzing station, a movable card platform normally positioned adjacent said station and arranged to support said inserted record card in position to be sensed, driving means operable to move said platform, control means on said platform and responsive to said inserted record for initiating operation of said driving means to move said platform whereby said inserted record is moved past said sensing means for a sensing operation, card clamping means on said platform, actuating means on said platform and normally effective to retain said clamping means in an open position to allow for insertion of said record card onto said platform, and means effective upon movement of said platform for releasing said actuating means to enable said card clamping means to close and clamp the card to said platform during movement of said platform.

2. A device as defined in claim 1 and including a stacker box, means effective after a predetermined travel of said platform and record card for operating said actuating means to open said clamping means and free said record card, and means for stripping the free record card from said moving platform and depositing same in said stacker box.

3. In a device of the class described having a card analyzing station and sensing means at said station for sensing perforations in record cards, a card feeding mechanism comprising, means for guiding an inserted record card to said analyzing station, a movable card platform normally positioned adjacent said sensing means for supporting said inserted record card in position to be sensed, pneumatic driving means operable to reciprocate said platform, control means on said platform and responsive to said inserted record for initiating operation of said driving means to move said platform whereby said inserted record is moved past said sensing means for a sensing operation, card clamping means on said platform and effective upon movement of said platform to clamp said inserted card to said platform, release means on said platform, means effective after a predetermined travel of said platform for actuating said release means to release said clamping means and free said record card from said moving platform, and second control means operated by said platform after predetermined travel thereof to initiate operation of said driving means to move said platform in a reverse direction back to its original position.

4. A device as defined in claim 3 wherein said card platform comprises an L-shaped member having its bottom leg normally positioned just underneath said sensing means and provided with a notched portion into which said record card is inserted, said L-shaped member being fastened to and supported by said pneumatic driving means.

5. In a device of the class described having a card analyzing station and sensing means at said station for sensing perforations in record cards, a card feeding mechanism comprising, a movable card platform normally positioned just beneath said sensing means and provided with a notched portion having a vertical side and an opposing side which is inclined so as to form a notch having a narrower opening at the top than at the bottom, a clamping roller in said notch, means for biasing said roller toward the top and against the vertical side of said notch, a release lever pivotally mounted on said platform, stationary means effective when the platform is in its normal position for pivoting said release lever to force said clamping roller down and away from the vertical side of said notch, means for guiding an inserted record into said notch and between said clamping roller and vertical side, and means for moving said platform whereby said inserted record card is carried past said sensing means for a sensing operation, the movement of said platform carrying the release lever free of said stationary means thereby enabling said biased clamping roller to move up and against the card and the vertical side of said notch to clamp the card during movement of said platform.

6. A device as defined in claim 5 and including a stationary camming surface effective after a predetermined travel of said platform to pivot said release lever whereby said clamping roller is forced down and away from the vertical side of said notch to free the inserted record card, and stationary knockout bars for stripping the free record card off of said moving platform.

References Cited in the file of this patent

UNITED STATES PATENTS

| | | |
|---|---|---|
| 1,827,259 | Peirce | Oct. 13, 1931 |
| 2,970,878 | Cunningham | Feb. 7, 1961 |